United States Patent
Fabri et al.

(10) Patent No.: US 11,219,219 B2
(45) Date of Patent: Jan. 11, 2022

(54) LIQUID COMPOSITION AND PROCESS THEREOF

(71) Applicant: UPL LTD, West Bengal (IN)

(72) Inventors: Carlos Eduardo Fabri, Sao Paulo (BR); Manubhai Panchal Digish, Mumbai (IN); Jaidev Rajnikant Shroff, Dubai (AE); Vikram Rajnikant Shroff, Dubai (AE)

(73) Assignee: UPL LTD., Haldia (IN)

( * ) Notice: Subject to any disclaimer, the term of this patent is extended or adjusted under 35 U.S.C. 154(b) by 79 days.

(21) Appl. No.: 16/637,380

(22) PCT Filed: Jan. 24, 2018

(86) PCT No.: PCT/IB2018/050423
§ 371 (c)(1),
(2) Date: Feb. 7, 2020

(87) PCT Pub. No.: WO2018/146566
PCT Pub. Date: Aug. 16, 2018

(65) Prior Publication Data
US 2020/0404924 A1    Dec. 31, 2020

(30) Foreign Application Priority Data
Feb. 11, 2017 (IN) .............................. 201731004976

(51) Int. Cl.
*A01N 59/06* (2006.01)
(52) U.S. Cl.
CPC ................................... *A01N 59/06* (2013.01)

(58) Field of Classification Search
CPC ....................................................... A01N 59/06
See application file for complete search history.

(56) References Cited

FOREIGN PATENT DOCUMENTS

| | | |
|---|---|---|
| FR | 1102374 A | 10/1955 |
| SU | 1049423 A1 | 10/1983 |
| WO | 200135746 | 5/2001 |

OTHER PUBLICATIONS

Harmrakulov et al (J. of Chern Tech and Metallury, 2015, V50, N1, 65-70). (Year: 2015).*
Novozhilov, 1.1., "Accelerating the ripening of summer vetch in the forest zone Referat. Zhur., Biol., 1960, No. 90513. (Translation)" from "Accelerating the ripening of summer vetch in the forest zone [5]" (1959) pp. 129-132, Document ID: PREV19664700083990. (Year: 1960).*
International Preliminary Report on Patentability; International Application No. PCT/IB2018/050423; International Filing Date Jan. 24, 2018; dated Apr. 18, 2018; 7 Pages.
International Search Report and Written Opinion; International Application No. PCT/IB2018/050423; International Filing Date Jan. 24, 2018; dated Apr. 18, 2018; 11 Pages.

* cited by examiner

*Primary Examiner* — Benjamin J Packard
(74) *Attorney, Agent, or Firm* — Cantor Colburn LLP

(57) ABSTRACT

The present invention provides a liquid composition for defoliation of crop plants comprising a metal chlorate and alkali metal halide. The invention also provides a process for preparing the liquid composition for defoliation of crop plants and a method of defoliating crop plants.

15 Claims, 1 Drawing Sheet

LIQUID COMPOSITION AND PROCESS THEREOF

CROSS REFERENCE TO RELATED APPLICATIONS

This application is a National Stage application of PCT/IB2018/050423, filed on Jan. 24, 2018, which claims the benefit of Indian Application No. 201731004976, filed on Feb. 11, 2017, both of which are incorporated by reference in their entirety herein.

FIELD OF THE INVENTION

This invention relates to a liquid composition for defoliation of crop plants. More particularly, it relates to a liquid composition for defoliation of crop plants and a process of preparing said composition.

BACKGROUND AND THE PRIOR ART

In the harvesting of growing crop plants, the presence of excessive foliage is undesirable. The removal of foliage from such crop plants like beans, potato, corn, cotton, and legume is very essential. Defoliation of various plants is desirable when the crop is harvested by hand as well as through mechanical process. Hand picking becomes easier and more comfortable when crops are defoliated. Defoliation is even more advantageous when mechanical pickers or harvesters are employed. Defoliated plants are free from leaves which would otherwise clog spindles of mechanical pickers or add to the trash which must be separated from the desired plant portion being harvested. In addition, when leaves are removed, the operator of the mechanical picker has a better view of the plants to be harvested and is thus able to position the picker over the plants more easily.

Another important reason for defoliation of plants particularly in case of beans is that the causative organisms of diseases like Rust, Bacterial blight Bean common mosaic virus, Bronzing and sunscald, *Alternaria* leaf spot Angular leaf spot, Anthracnose are on the foliar portions of the plants and if the plants are not thoroughly defoliated, the agents will be transferred to the beans and may deteriorate the quality of the harvest.

A defoliant is a substance which when applied to a growing plant, which is normally undergoing defoliation during its life cycle at maturity, causes an accelerated dropping of the leaves without destroying the plant. For economic reasons, defoliants must be effective in relatively low concentrations.

Defoliants are generally applied to crop plants when crop is about to reach the harvesting stage. Defoliants are applied either as solid formulations (e.g. dust or powder, granules) or liquid formulations (e.g. Suspension concentrate, Emulsifiable concentrate etc.). The problem with the solid formulation is dustability, low pourability, difficulty in packing, health hazards due to inhalation and skin irritation. Dust defoliants are bulky, difficult to apply uniformly, dependent on dew for retention and activation on the cotton plant, and highly susceptible to drift. Also, it is difficult to make available the effective amount of active ingredients onto the foliar parts in the presence of wind and other ecological factors. Liquid formulations can be prepared conveniently even at the time of application by mixing a dispersible powder, solution, or suspension of defoliant chemical with water. Liquid defoliants along with surface active agents when applied to plants, they spread on the leaves rather than gathering into drops, thus providing a much larger area of contact and, in addition, tending to ensure that the defoliant will remain on the plant rather than running off of or being shaken from the plant.

A number of compounds, when applied to leaves of the growing plants, have been found to result in desirable defoliation. Among these are included products such as pentachlorophenol, sodium chlorate, magnesium chlorate, magnesium chlorate hexahydrate, calcium cyanamide, sodium 3, 6-endoxohexahydrophthalate, etc. The chemicals are available as either dusts or sprays and can be applied, by either airplanes or ground machines with one exception if it is necessary to defoliate only the bottom part of a plant at a given time, only ground machines and sprays can be used.

Magnesium chlorate is a known defoliant since long. This chemical was first offered commercially for use as a cotton defoliant in 1952. Currently it is available as magnesium chlorate hexahydrate and as magnesium chloride-sodium chlorate, which are mixed together in aqueous solution, to form magnesium chlorate hexahydrate. Magnesium chlorate is an effective defoliant and is preferred where foliage is tough and more leaf surface activity is required. Magnesium chlorate is applied in the form of solid powder as well as liquid spray defoliants. It is observed that the better defoliation is obtained when plants are treated with a liquid spray of Magnesium chlorate.

The most serious problem with the conventional liquid magnesium chlorate defoliants is the high sodium salt content. The excess salt accumulates in the soil and causes injury to the crop plant. When salt dissolves in water, sodium and chloride ions separate and may then harm the plants. Chloride ions are readily absorbed by the roots, transported to the leaves, and accumulate there to toxic levels. It is these toxic levels that cause the characteristic marginal leaf scorching. High salt content in buds and small twigs of some plant species lead to loss of cold hardiness and plants become more susceptible and even killed by freezing.

Another problem identified with the conventional liquid magnesium chlorate composition is that while preparing its dilution in water for the purpose of spraying it onto crops for defoliation, or burndown activity, conventional liquid magnesium chlorate having high sodium chloride resulted into slimy and hygroscopic slurry. The slurry is not suitable for spray due to uneven concentration and perhaps it is prone to choke nozzle of an applicator.

The present invention seeks to overcome at least one, and preferably more than one, of the above disadvantages.

OBJECTIVES

Accordingly, it is an object of the present invention to provide a liquid composition of magnesium chlorate for defoliation of crop plants.

It is another object of the present invention to provide process of preparing the liquid composition for defoliation of crop plants that contains lesser amount of sodium salts.

It is another object of the present invention to provide the liquid composition which has greater ease of application in burndown and defoliant actions.

It is another object of the present invention to provide the liquid composition which can be used to defoliate crop plants even in relatively cool weather.

It is another object of the present invention to provide the liquid composition which have normal spraying moment without any drift.

SUMMARY OF THE INVENTION

A liquid composition for defoliation of crop plants, the composition comprising:
(a) a metal chlorate; and
(b) a reduced quantity of an alkali metal halide.

A process for preparing a liquid composition for defoliation of crop plants, the process comprising:
(a) dissolving an alkali metal chlorate and alkali metal halide in water; and
(b) adding a second metal halide to the reaction mass.

A method of defoliating crop plants, said method comprising applying, to the crop plants that are required to be defoliated, a liquid composition comprising a metal chlorate; and a reduced quantity of an alkali metal halide.

DESCRIPTION OF THE INVENTION

Figure 1:
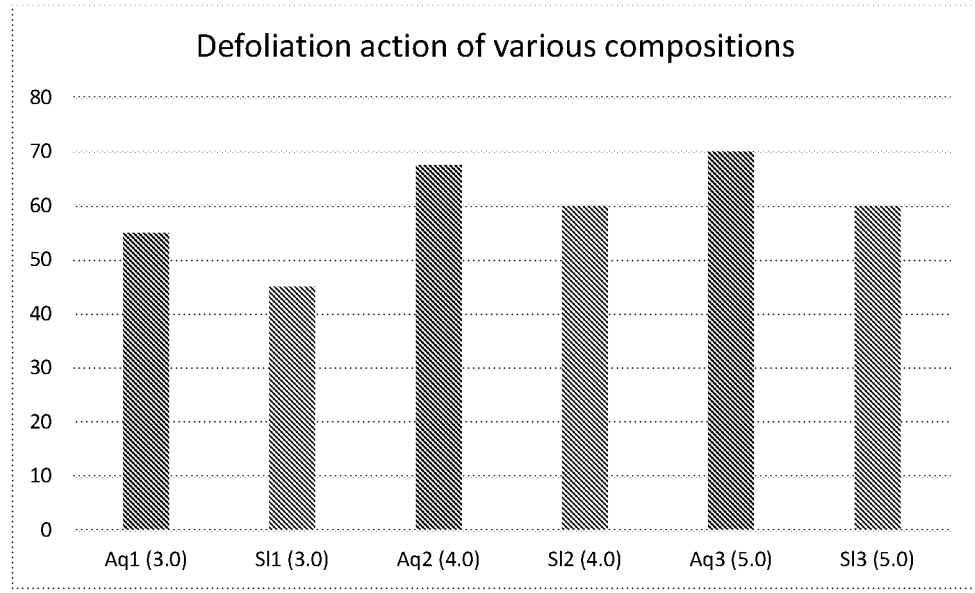
FIG. 1 shows evaluation of defoliation activity of exemplary liquid formulations of the disclosure with different concentrations of magnesium cholorate on a bean crop.

It has now been found, surprisingly, that these disadvantages of magnesium chlorate are overcome and liquid magnesium chlorate performs well when the relative percentage of halide salt is lesser in the defoliant composition in comparison to the conventional compositions. This composition of Magnesium chlorate and sodium chloride defoliate crop plants, even in relatively cool weather.

Thus, in an aspect, the present invention provides a liquid composition for defoliation of crop plants, the composition comprising:
(a) a metal chlorate; and
(b) a reduced quantity of an alkali metal halide.

It has now been found that a defoliant composition containing a metal chlorate as the defoliant is more physicochemically stable and demonstrates better defoliant and burndown activity when the quantity of the metal halide in the composition is reduced in comparison to the conventional defoliant compositions. All the conventional defoliant compositions included an appreciable quantity of the 'contaminant_ alkali metal halide. It was found that when liquid defoliant compositions were prepared comprising reduced quantities of the alkali metal halide in comparison to the conventional defoliant compositions, the resultant compositions surprisingly possessed better physicochemical stability in addition to improved defoliant and burndown activity.

The term 'reduced quantity_ of alkali metal halide as used herein denotes a quantity of the alkali metal halide that is less than 30% by total weight of the composition, preferably less than 20% by total weight of the composition, more preferably less than 10% of weight of the composition, and most preferably less than 7.5% by total weight of the composition.

According to another embodiment of the present invention, the liquid composition for defoliation of crop plants comprises from about 0.1% to about 95% and preferably from about 10% to about 80% of the metal chlorate by total weight of the composition.

In a preferred embodiment of the present invention, the metal chlorate is present in an amount from about 20% to about 70% of the total weight of the defoliant composition.

In an embodiment, the metal chlorate defoliant may be selected from the group consisting of sodium chlorate, magnesium chlorate, calcium chlorate, calcium-magnesium chlorate and potassium chlorate.

In an embodiment, the metal chlorate defoliant is magnesium chlorate.

In an embodiment, the metal chlorate defoliant may include trace amounts of inherent phosphorus.

In an embodiment, the defoliant composition of the present invention comprises a reduced quantity of an alkali metal halide than is present in all known defoliant compositions.

In an embodiment, the defoliant composition of the present invention comprises a reduced quantity of sodium halide.

In an embodiment, the defoliant composition of the present invention comprises a reduced quantity of sodium chloride.

According to another embodiment of the present invention, the liquid composition for defoliation of crop plants comprises from about 0.1% to about 30% and preferably from about 1% to about 20% of sodium chloride by the total weight of the composition.

In a preferred embodiment of the present invention, sodium chloride is present in an amount from about 2% to about 10% of the total weight of the herbicide formulation.

In an embodiment, the defoliant composition of the present invention comprises water.

In an embodiment, water is used in a sufficient quantity to enable stable compositions of the metal chlorate defoliant of a desired strength to be prepared. The percentage quantity of water present in the liquid compositions of the present inventions is not particularly limiting and may be conveniently decided by a person skilled in the art.

In an embodiment, the liquid composition of the present invention is in the form of an aqueous formulation. The aqueous formulation of the invention has greater ease of application in defoliant actions, greater ease of application in burndown actions, can be used to defoliate crop plants even in relatively cool weather, has a normal spraying moment without any drift and therefore does not cause any harm to the neighbouring crops, and does not produce foam during application of the composition on the crop plants.

In an aspect, the present invention provides a process for preparing a liquid composition for defoliation of crop plants.

The process for preparing the liquid composition comprises:
(a) dissolving an alkali metal chlorate and alkali metal halide in water; and
(b) adding a second metal halide to the reaction mass.

The alkali metal chlorate and alkali metal halide form the cation portion of the metal halide component of the composition, while the second metal halide provides the metal portion of the final metal chlorate defoliant.

In an embodiment, sodium chlorate and sodium chloride are dissolved in water, to which an alkaline earth halide is added to form the corresponding alkaline earth chlorate defoliant.

In an embodiment, sodium chlorate and sodium chloride are dissolved in water, to which magnesium chloride is added to form the corresponding magnesium chlorate defoliant. This composition comprises sodium chloride as the salt.

In another embodiment, the liquid composition remains stable at low temperature.

In an embodiment, the defoliant composition of the present invention may be prepared by a non-limiting process comprising the steps of:

(a) dissolving sodium chlorate and sodium chloride in charged water at temperature not exceeding 40° C. in a suitable assembly;
(b) heating the mixture to a temperature not less than 90° C. and adding magnesium chloride solution for 60 minutes and continue heating for at least one hour to obtain reaction mass;
(c) cooking the reaction mass at temperature not less than 100° C. for atleast 4 hours;
(d) recovering water upon completion of reaction by applying pressure;
(e) adding acetone to the reaction mass and stirring for atleast 60 minutes at a temperature not less than 50° C. and further cooling the reaction mass;
(f) filtering the reaction mass and washing it with acetone;
(g) recovering the acetone at a temperature not exceeding 90° C. atmospherically; and adding water to magnesium chloride to obtain desired strength.

In another aspect, the present invention also provides a method of defoliating crop plants, said method comprising applying, to the crop plants that are required to be defoliated, a liquid composition comprising a metal chlorate; and a reduced quantity of an alkali metal halide.

In another embodiment, the liquid composition is effective in defoliating crop plants even at relatively cool weather.

The preferred embodiments of the liquid composition used in this aspect of the invention are as described hereinabove in respect of the preferred embodiments for the liquid compositions of the invention.

The process of preparing liquid composition containing magnesium chlorate is ascertained by the experiments as exemplified below. These examples are merely illustrations and are not to be understood as limiting the scope and underlying principles of the invention in anyway. Indeed, various modifications of the invention in addition to those shown and described herein will become apparent to those skilled in the art from the following examples and foregoing description.

Example 1

Equipped assembly with overhead stirrer, condenser, and an addition funnel in Oil-Bath. Sodium chlorate crystal and sodium chloride were dissolved in charged water at 30-35éC. The quantity of ingredients is according to Table 1. Magnesium chloride solution was added to the mixture and further heated for 1 hour at 90éC to obtain reaction mass of magnesium chlorate. The reaction mass was continued to cook for at least 4 hours at temperature not less than 100éC. At the completion of reaction, water was removed under vacuum and wet cake was obtained. Acetone wash was applied to the wet cake at least for 1 hour at temperature not exceeding 70éC and kept for drying. After acetone wash, wet cake was filtered and dried and finally 50-52% magnesium chlorate was obtained from the above procedure.

TABLE 1

| Ingredients | Quantity |
| --- | --- |
| Sodium chlorate | 661 g |
| Sodium chloride | 39 g |
| Magnesium chloride solution | 1000 g |
| Charged water | 808 g |

Test for Storage Stability

The liquid magnesium chlorate composition according to present invention was tested for storage stability. Stability of the solid magnesium chlorate was also ascertained for comparative assessment of the liquid and solid magnesium chlorate preparations. The storage stability of solid magnesium chlorate and liquid magnesium chlorate according to the present invention is presented in the below tables (Table 2):

TABLE 2

| REAL TIME STABILITY DATA OF MAGNESIUM CHLORATE (50% SOLUTION) | | | | | |
| --- | --- | --- | --- | --- | --- |
| | STABILITY AT RT | | | | |
| Batch No. UPA/890-009/#177 | 0 days | 15 days | 30 days | 60 days | 90 days |
| % Mg(ClO$_3$)$_2$ | 51.86 | 51.70 | 51.80 | 51.75 | 51.81 |
| % NaCl | 5.90 | 5.97 | 5.99 | 6.00 | 6.00 |
| REAL TIME STABILITY DATA OF MAGNESIUM CHLORATE SOLID | | | | | |
| | STABILITY AT RT | | | | |
| Batch No. UPA/879-113/#165 | 0 days | 60 days | 90 days | 120 days | 180 days |
| % Mg(ClO$_3$)$_2$ | 42.75 | 42.18 | 41.72 | 41.11 | 40.18 |
| % NaCl | 25.75 | 25.90 | 26.15 | 26.20 | 26.23 |

The results of the above table show that samples UPA/890-009/#177 prepared according to method described in the present invention and UPA/879-113/#165 was prepared according to the standard conventional procedure. It can be seen from the table that liquid magnesium chlorate, comprising the reduced amount of sodium chloride, was quite stable from 0-90 days with very less degradation. The amount of sodium chloride also remained almost stable from 0-90 days. A clear solution was thus maintained over the scale of 0-90 days.

Similarly, solid magnesium chlorate was assessed for real time stability on the scale of 0-180 days. A little deterioration of magnesium chlorate was observed. There was negligible deterioration in the amount of sodium chloride.

Preparation of Liquid Magnesium Chlorate with Higher Amount of Sodium Chloride

With an objective to study the effect of quantity of sodium chloride in the liquid compositions, the liquid composition of magnesium chlorate with 5% sodium chloride was compared with a liquid composition of magnesium chlorate with 10% sodium chloride. Liquid compositions (Table 3) were prepared according to the process disclosed in the present invention with 5% and 10% sodium chloride respectively.

Physical observations (Table 4) were made to identify critical features with liquid composition of magnesium chlorate with 10% sodium chloride. It was observed that the liquid composition of magnesium chlorate remains stable at ambient conditions but sodium chloride crystallize at low temperature. A separate layer of sodium chloride crystals settled at the bottom of the flask with liquid magnesium chlorate composition with 10% sodium chloride.

TABLE 3

| Ingredients | Quantity (%) | |
| --- | --- | --- |
| Magnesium Chlorate | 52 | 52 |
| Sodium Chloride | 5 | 10 |
| Water | q.s. | q.s. |
| Total | 100 | 100 |

TABLE 4

| Observations | Liquid composition of magnesium chlorate with 5% sodium chloride | Liquid composition of magnesium chlorate with 10% sodium chloride |
| --- | --- | --- |
| Physical Appearance at Ambient | Clear | Translucent |
| Physical Appearance at Low Temperature | Clear | Layer of Sodium Chloride settled at the bottom. |
| Hygroscopicity | 1.28 | 1.64 |

Field Trial

Example 1

Test in Beans-Pre-Harvesting
Details of experiment:
a) Treatments: 8 (Eight)
b) Test Crop: Beans
c) Time of application: Pre-harvest
d) Observation days: 2 days after application
e) Treatment details: This study was performed on beans crop where the crop was ready for harvest. The aim of study was to evaluate the efficacy of liquid composition of magnesium chlorate in defoliation and also its burndown effect Field study was conducted to evaluate performance of the liquid composition of the present invention in comparison to the conventional solid. To observe the burn down and defoliation effect, a portion of land with standing crops without receiving any kind of treatment was considered as control.

Various liquid compositions (Aq1, Aq2 and Aq3) were prepared at different dosages of magnesium chlorate (3 Kg/Ha, 4 Kg/Ha and 5 Kg/Ha) to optimize effective dose of magnesium chlorate in the liquid composition as defoliant. Similarly, solid compositions (SI1, SI2, SI3 and SI4) were prepared with varied dosages (3 Kg/Ha, 4 Kg/Ha and 5 Kg/Ha) of magnesium chlorate. All these compositions were evaluated for defoliation activity. The bean crop was evaluated on second day after treatment for defoliation action of liquid composition (Table 5 and FIG. 1). Crop received three treatments with different dosages vis. 3 kg/Ha as Aq1, 4 Kg/Ha as Aq2 and 5 Kg/Ha as Aq3 of the liquid composition. Similarly, three treatments of different dosages vis. 3 kg/Ha as SI1, 4 Kg/Ha as SI2 and 5 Kg/Ha as SI3 of conventional solid composition were given to the crop. Upon evaluating defoliation effect on 2DAT, it was found that liquid composition resulted in better defoliation in comparison to untreated control and the conventional solid composition.

Comparative study of liquid Magnesium Chlorate composition and Solid Magnesium Chlorate composition to evaluate defoliant activity.

TABLE 5

| | | Crop Defoliation 2DAT | | | | |
| --- | --- | --- | --- | --- | --- | --- |
| # | Product (Kg-L/Ha) | Block 1 | Block 2 | Block 3 | Block 4 | Average |
| 1 | Check | 0 | 0 | 0 | 0 | 0 |
| 2 | Aq1 (3.0) | 60 | 60 | 70 | 70 | 65 |
| 3 | Aq2 (4.0) | 75 | 60 | 60 | 65 | 65 |
| 4 | Aq3 (5.0) | 70 | 70 | 60 | 65 | 66.25 |
| 5 | SI1 (3.0) | 40 | 40 | 65 | 60 | 51.25 |
| 6 | SI2 (4.0) | 65 | 60 | 50 | 35 | 52.5 |
| 7 | SI3 (5.0) | 70 | 75 | 50 | 50 | 61.25 |

Figure 2:
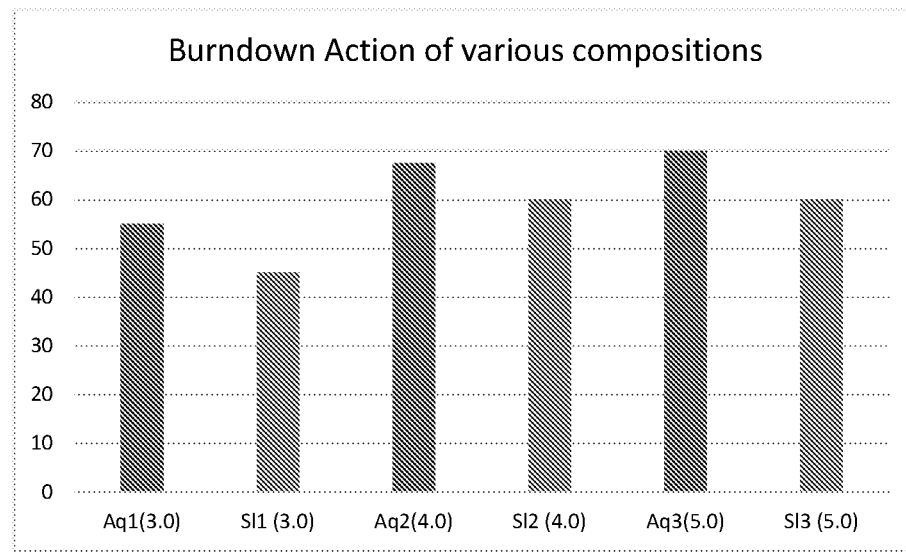
FIG. 2 shows evaluation of burndown activity of exemplary liquid formulations of disclosure with different concentration of magnesium chlorate on a bean crop.

Similarly, liquid composition (Aq1, Aq2 and Aq3) were prepared at different dosages of magnesium chlorate (3 Kg/Ha, 4 Kg/Ha and 5 Kg/Ha) to optimize effective dose of magnesium chlorate in the liquid composition as burndown. Solid composition (SI1, SI2, SI3 and SI4) were prepared with varied dosages (3 Kg/Ha, 4 Kg/Ha and 5 Kg/Ha) of magnesium chlorate. All these compositions were evaluated for burndown activity. The bean crop was evaluated on second day after treatment for defoliation action of liquid composition (Table 6 and FIG. 2). Crop received three treatments with different dosages vis. 3 kg/Ha as Aq1, 4 Kg/Ha as Aq2 and 5 Kg/Ha as Aq3 of the liquid composition. Three treatments of different dosages vis. 3 kg/Ha as SI1, 4 Kg/Ha as SI2 and 5 Kg/Ha as SI3 of conventional solid composition were also given to the crop. Upon evaluating burndown effect on 2DAT, it was found that liquid composition resulted in better burndown in comparison to untreated control and the conventional solid composition.

Comparative study of liquid Magnesium Chlorate composition and Solid Magnesium Chlorate composition to evaluate burndown activity.

TABLE 6

| | | Crop Burndown 2 DAT | | | | |
| --- | --- | --- | --- | --- | --- | --- |
| # | Product (Kg-L/Ha) | Block 1 | Block 2 | Block 3 | Block 4 | Average |
| 1 | Check | 0 | 0 | 0 | 0 | 0 |
| 2 | Aq1 (3.0) | 50 | 60 | 50 | 60 | 55 |
| 3 | Aq2 (4.0) | 80 | 60 | 70 | 60 | 67.5 |
| 4 | Aq3 (5.0) | 80 | 70 | 60 | 70 | 70 |
| 5 | SI1 (3.0) | 30 | 40 | 60 | 50 | 45 |
| 6 | SI2 (4.0) | 70 | 70 | 60 | 40 | 60 |
| 7 | SI3 (5.0) | 60 | 80 | 40 | 60 | 60 |

Therefore, it was concluded that the liquid composition having lesser sodium salt content of the present invention showed far more superior effect in both defoliation action as well as burndown action. The liquid composition with lesser sodium salt content does not affect the plant adversely. The liquid composition is found better than the solid conventional composition of Magnesium chlorate in terms of efficacy.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples 丞 herein. The invention should therefore not be limited by the above described embodiment, method, and examples, but by all embodiments and methods within the scope and spirit of the invention.

The invention claimed is:

1. A liquid composition for defoliation of crop plants, the liquid composition consisting of:
    about 10 wt % to about 80 wt % magnesium chlorate;
    about 2 wt % to about 30 wt % of sodium chloride, each based on a total weight of the liquid composition, and water.

2. The liquid composition as claimed in claim 1, wherein the sodium chloride is present in an amount from about 2% to about 10% of the total weight of the liquid composition.

3. The liquid composition as claimed in claim 1, wherein the sodium chloride is present in an amount less than 20% by the total weight of the liquid composition.

4. The liquid composition as claimed in claim 1, wherein the sodium chloride is present in an amount less than 10% by the total weight of the liquid composition.

5. The liquid composition as claimed in claim 1, wherein the sodium chloride is present in an amount less than 7.5% by the total weight of the liquid composition.

6. A process for preparing a liquid composition for defoliation of crop plants, wherein the process comprising:
    a) dissolving an alkali metal chlorate and alkali metal halide separately in water at a temperature of less than or equal to about 40° C. to provide a solution; and
    b) heating the solution to a temperature not less than about 90° C. and adding magnesium chloride to the heated solution to obtain a reaction mixture;
    c) heating the reaction mixture at a temperature not less than about 100° C. for at least about four hours to obtain a first product;
    d) removing water from the first product to form a second product;
    e) adding acetone to the second product and stirring for at least 60 minutes at a temperature of not less than 50° C. to form a third product, and further cooling the third product;
    f) filtering the third product after cooling to obtain a precipitate;
    g) removing acetone from the precipitate at a temperature not exceeding 90° C. obtain a fourth product, and adding water to the fourth product thereby forming the liquid composition.

7. The process for preparing a liquid composition as claimed in claim 6, wherein
    the alkali metal chlorate consists of of sodium chlorate and the alkali metal halide consists of sodium chloride.

8. A method of defoliating crop plants, said method comprising applying, to the crop plants that are required to be defoliated, a liquid composition consisting of about 10 wt % to about 80 wt % of magnesium chlorate; about 2 wt % to about 30 wt % of sodium chloride, each based on a total weight of the composition; and water.

9. The liquid composition of claim 1, wherein the liquid composition consists of:
    about 20 wt % to about 70 wt % of the magnesium chlorate;
    about 2 wt % to about 10 wt % of the sodium chloride, each based on the total weight of the liquid composition; and
    water.

10. The liquid composition of claim 9, wherein the sodium chloride is present in an amount of about 2 wt % to less than 7.5 wt. % based on the total weight of the liquid composition.

11. The method of claim 7, wherein the liquid composition consists of:
    about 10 wt % to about 80 wt % of the magnesium chlorate;
    about 2 wt % to about 30 wt % of the sodium chloride, each based on the total weight of the liquid composition; and
    water.

12. The method of claim 7, wherein the liquid composition consists of:
    about 20 wt % to about 70 wt % of the magnesium chlorate;
    about 2 wt % to about 10 wt % of the sodium chloride, each based on the total weight of the liquid composition; and
    water.

13. The method of claim 12, wherein the sodium chloride is present in an amount of about 2 wt % to less than 7.5 wt. % based on the total weight of the liquid composition.

14. The method of claim 8, wherein the liquid compositions consists of:
    about 20 wt % to about 70 wt % of the magnesium chlorate;
    about 2 wt % to about 10 wt % of the sodium chloride, each based on the total weight of the liquid composition; and
    water.

15. The method of claim 14, wherein the sodium chloride is present in an amount of about 2 wt % to less than 7.5 wt. % based on the total weight of the liquid composition.

* * * * *